United States Patent
Hiroi et al.

(10) Patent No.: US 8,218,945 B2
(45) Date of Patent: Jul. 10, 2012

(54) MOTION PICTURE RECORDING/REPRODUCING APPARATUS

(75) Inventors: Kazushige Hiroi, Machida (JP); Yoshifumi Fujikawa, Yokohama (JP); Norikazu Sasaki, Ebina (JP); Riri Ueda, Ebina (JP); Akio Hayashi, Tokyo (JP); Yukio Fujii, Yokohama (JP); Atsuo Kawaguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 704 days.

(21) Appl. No.: 11/313,829

(22) Filed: Dec. 22, 2005

(65) Prior Publication Data
US 2006/0147184 A1    Jul. 6, 2006

(30) Foreign Application Priority Data

Dec. 24, 2004    (JP) ................... 2004-372537

(51) Int. Cl.
| | |
|---|---|
| H04N 5/93 | (2006.01) |
| G11B 27/00 | (2006.01) |
| G11B 27/02 | (2006.01) |
| G11B 20/10 | (2006.01) |
| G11B 19/02 | (2006.01) |
| G11B 15/52 | (2006.01) |
| G11B 5/09 | (2006.01) |

(52) U.S. Cl. ........ 386/278; 386/280; 386/285; 386/286; 386/290; 360/13; 369/47.13; 369/83

(58) Field of Classification Search ............... 386/52, 386/55, 95, 96, 278, 280, 285, 286, 290; 360/13; 369/47.13, 83
See application file for complete search history.

(56) References Cited

U.S. PATENT DOCUMENTS

| 6,920,281 | B1 * | 7/2005 | Agnibotri et al. ............. 386/125 |
|---|---|---|---|
| 7,013,477 | B2 * | 3/2006 | Nakamura et al. ............. 725/32 |
| 7,065,777 | B2 * | 6/2006 | Inoue ............................. 725/39 |
| 2002/0131496 | A1 * | 9/2002 | Vasudevan et al. ...... 375/240.11 |
| 2003/0016945 | A1 | 1/2003 | Nakamura |
| 2004/0126089 | A1 | 7/2004 | Suzuki |
| 2005/0276567 | A1 * | 12/2005 | Okuyama et al. ............. 386/46 |

FOREIGN PATENT DOCUMENTS

| CN | 1344413 | 4/2002 |
|---|---|---|
| CN | 1516455 | 7/2004 |

(Continued)

OTHER PUBLICATIONS

Daniel Dementhon et al., "Video Summarization by Curve Simplifiation", MDA, 9049-6C-1250, Jul. 1998, pp. 1-19.

*Primary Examiner* — Daquan Zhao
(74) *Attorney, Agent, or Firm* — Antonelli, Terry, Stout & Kraus, LLP.

(57) ABSTRACT

A motion picture recording/reproducing apparatus for embodying the technique includes, at least, a motion picture data input unit which inputs the motion picture data, a storage unit which stores the motion picture data, a recording unit which stores the motion picture data in the storage unit, a feature generating unit which generates a feature of the motion picture data, a ranking generating unit which provides ranking of scenes in the motion picture data according to their importance levels, a reproduction scene deciding unit which decides a reproduction image for each of the scenes in the motion picture data, and a category acquiring unit which acquires the category of the motion picture data. The ranking generating unit provides ranking of the scenes in the input motion picture data on the basis of the acquired category.

15 Claims, 13 Drawing Sheets

FOREIGN PATENT DOCUMENTS

| | | |
|---|---|---|
| JP | 09-247617 | 9/1997 |
| JP | 2000-250944 | 9/2000 |
| JP | 2001-101840 | 4/2001 |
| JP | 2001-143451 | 5/2001 |
| JP | 2002-142189 | 5/2002 |
| JP | 2002-281449 | 9/2002 |
| JP | 2002-330393 | 11/2002 |
| JP | 2003-110982 | 4/2003 |
| JP | 2003-143558 | 5/2003 |
| JP | 2003-153139 | 5/2003 |
| JP | 2003-224790 | 8/2003 |
| JP | 2003-283993 | 10/2003 |
| JP | 2004-040145 | 2/2004 |
| JP | 2004-072396 | 3/2004 |
| JP | 2004-126811 | 4/2004 |
| JP | 2004-312567 | 11/2004 |
| WO | WO 01/35416 | 5/2001 |

* cited by examiner

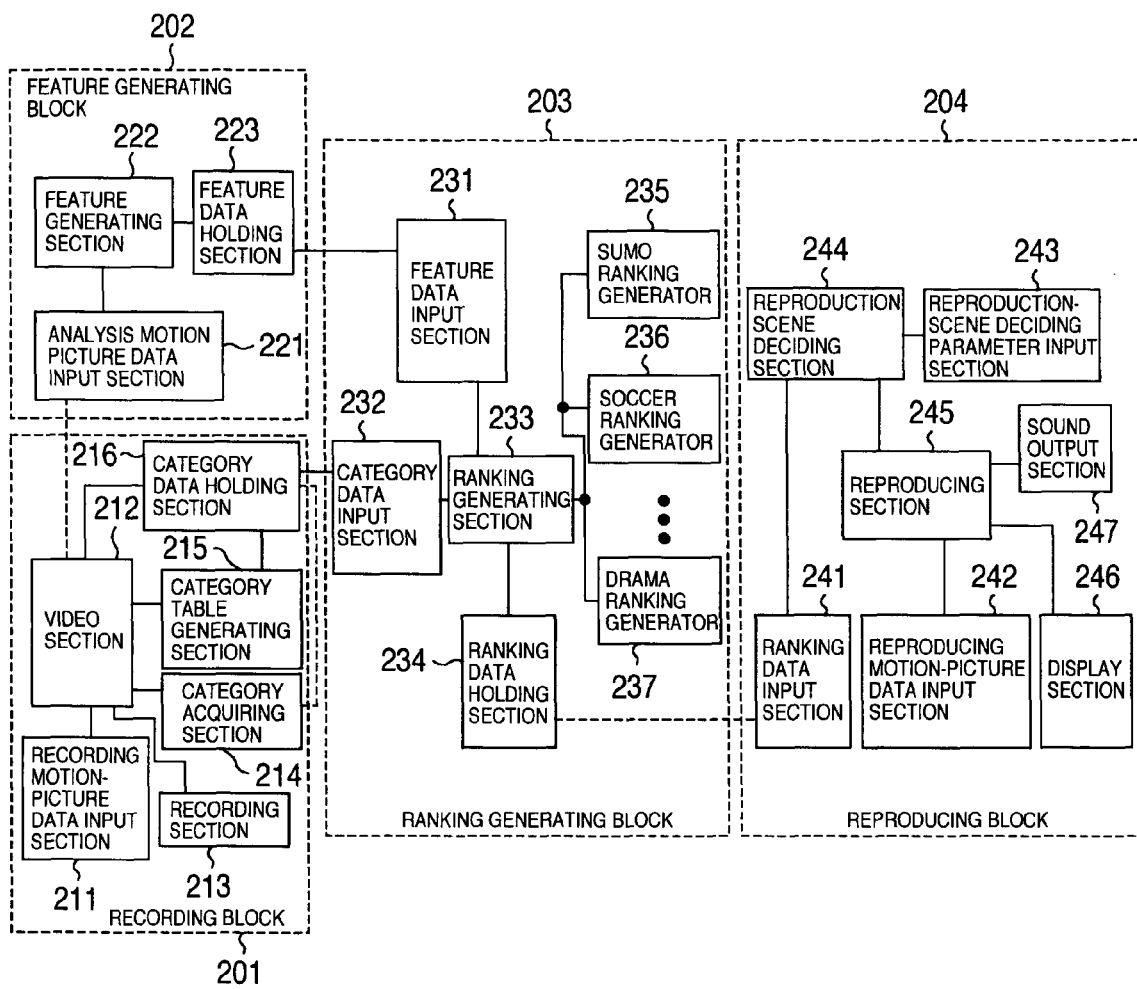

FIG.4

| FILE NAME (401) | CATEGORY (402) |
|---|---|
| A4 (403) | A5 |
| B4 (404) | B5 |
| C4 (405) | C5 |
| D4 (406) | D5 |

FIG.5

| RANK (501) | START POSITION (SECONDS) (502) | END POSITION (SECONDS) (503) |
|---|---|---|
| 1 (504) | 150 | 155 |
| 2 (505) | 100 | 110 |
| 3 (506) | 20 | 40 |
| 4 (507) | 350 | 460 |
| 5 (508) | 200 | 250 |

MOTION PICTURE RECORDING/REPRODUCING APPARATUS

INCORPORATION BY REFERENCE

The present application claims priority from Japanese application JP2004-372537 filed on Dec. 24, 2004, the content of which is hereby incorporated by reference into this application.

BACKGROUND OF THE INVENTION

This invention relates to a motion picture recording/reproducing apparatus for recording and reproducing motion picture data.

In these years, realization of multichannel broadcasting or broadband network for motion picture data based on digital television broadcast has enabled users to acquire or view many sorts of motion picture data. In addition, a motion picture compressing/decompressing technique has been improved, hardware/software for realizing the technique have been increasingly cheaper, and storage media have been increased in capacity and decreased in cost. As a result, users can easily store many sorts of motion picture data, and the quantity of motion picture data recordable and viewable is increasing. However, a busy user has no time to view all of such motion picture data, and consequently keeps an overflowing quantity of motion picture data not viewed yet in actual situations. For such a reason, it becomes important that, by viewing only vital scenes in many sorts of motion picture data, such a busy user can understand the contents of the sorts of motion picture data in a short time or can search for one of such many sorts of motion picture data which the user can really want to view.

In view of such circumstances, a technique for displaying an important scene in motion picture data is introduced, for example, in JP-A-2003-153139 or in "D. DeMenthon, V. Kobla, and D. Doermann, Video Summarization by Curve Simplification ACM Multimedia 98, Bristol, England, pp. 211-218, 1998 (Non-patent Literature 1)".

Introduced in the above "Video Summarization by Curve Simplification", in particular, is a technique for generating a feature from motion picture data, carrying out extraction and ranking of an important scene on the basis of the feature, and reproducing only the important scene at a rate specified by the user. By such a technique, it becomes possible for the user to grasp the contents of motion picture data in a short time.

SUMMARY OF THE INVENTION

As has been explained above, the technique for grasping the contents of motion picture data in a short time on the basis of display of only an important scene (which will be referred to as highlight reproduction, in the following explanation and drawings) is proposed. However, the definition of an important scene in motion picture data is not determined uniquely but varies depending on the category of the motion picture data. For example, when the motion picture data is of a drama, a higher importance level should be applied to a longer scene; whereas, when the motion picture data is of a sports, a higher importance level should be applied to a scene having a larger sound volume level. Even for a sports, it is desirable to vary the length of a scene to be reproduced including a position of the large sound volume level. In other words, it is necessary to change the extracting and ranking methods for the important scene depending on the category of motion picture data. Otherwise, it becomes impossible to realize suitable highlight reproduction for all the motion picture data.

It is therefore an object of this invention to provide a motion picture recording/reproducing apparatus which can solve the problem in the prior art and can realize the optimum highlight reproduction according to the category of motion picture data.

In accordance with an aspect of this invention, the above object is attained by providing a motion picture recording/reproducing apparatus which includes a motion picture data input unit which inputs motion picture data, a storage unit which stores the motion picture data therein, a recording unit which stores the motion picture data in the storage unit, a feature generating unit which generates a feature of the motion picture data, a ranking generating unit which provides ranking of respective scenes in the motion picture data on the basis of the generated feature according to the importance level, a reproduction scene deciding unit which decides a reproduction scene on the basis of the generated ranking, a reproducing unit which reproduces the decided reproduction scene, a display unit which displays the reproduced image, and a category acquiring unit which acquires a category of the motion picture data. In the apparatus, the ranking generating unit provides ranking of scenes in the input motion picture data on the basis of the acquired category. The category acquiring method of the category acquiring unit is carried out by any one of the following methods.

The motion picture recording/reproducing apparatus further includes a broadcast data input unit. The category acquiring unit receives broadcast data from the broadcast data input unit, acquires an electronic program guide from the data being broadcast, and acquires a category for the motion picture data from data about the electronic program guide. When the apparatus fails to acquire the data on the electronic program guide including the category of the motion picture data when the recording unit starts recording of the motion picture data, in particular, the apparatus, using the recording start as a trigger, receives the broadcast data from the broadcast data input unit, and acquires the data of the electronic program guide from the broadcast data.

The motion picture recording/reproducing apparatus further includes a network data transmitting/receiving unit. The network data transmitting/receiving unit acquires the electronic program guide from a predetermined server via a network, and acquires the category of the motion picture data from the data about the electronic program guide. When the apparatus fails to acquire the data about the electronic program guide including the category of the motion picture data when the recording unit starts recording of the motion picture data, in particular, the apparatus, using the recording start as a trigger, acquires the data of the electronic program guide from the predetermined server via the network under control of the network data transmitting/receiving unit.

The motion picture recording/reproducing apparatus further includes an input unit for the user to enter a category. The category acquiring unit acquires the category entered by the user from the input unit.

The motion picture recording/reproducing apparatus further includes a sound recognizing unit which recognizes a sound included in the motion picture data. The category acquiring unit recognizes the sound included in the motion picture data from the sound recognizing unit, counts frequencies of predetermined keywords appeared therein, and determines the motion picture data on the basis of the counted result.

The motion picture recording/reproducing apparatus further includes a caption data acquiring unit which acquires a caption included in the motion picture data. The category acquiring unit acquires a character string of the caption included in the motion picture from the caption data acquiring unit, counts frequencies of predetermined keywords appeared therein, and determines a category for the motion picture data on the basis of the counted result.

Since suitable highlight reproduction can be realized for motion picture data of all categories, the user can grasp the contents of an overflowing quantity of viewable motion picture data in a short time, properly and efficiently.

Other objects, features and advantages of the invention will become apparent from the following description of the embodiments of the invention taken in conjunction with the accompanying drawings.

BRIEF DESCRIPTION OF THE DRAWINGS

FIG. 2 is a functional block diagram of an embodiment 1 of this invention.

FIG. 3 shows an example of a structure of data of an electronic program guide acquired by a category acquiring unit in the embodiment 1.

FIG. 4 shows an example of a data structure of a category table generated by a category table generating unit in the embodiment 1.

FIG. 5 shows an example of a structure of ranking data generated by a ranking generating unit in the embodiment 1.

DETAILED DESCRIPTION OF THE EMBODIMENTS

Embodiments of this invention will be explained with reference to the accompanying drawings.

Embodiment 1

Figure 1:
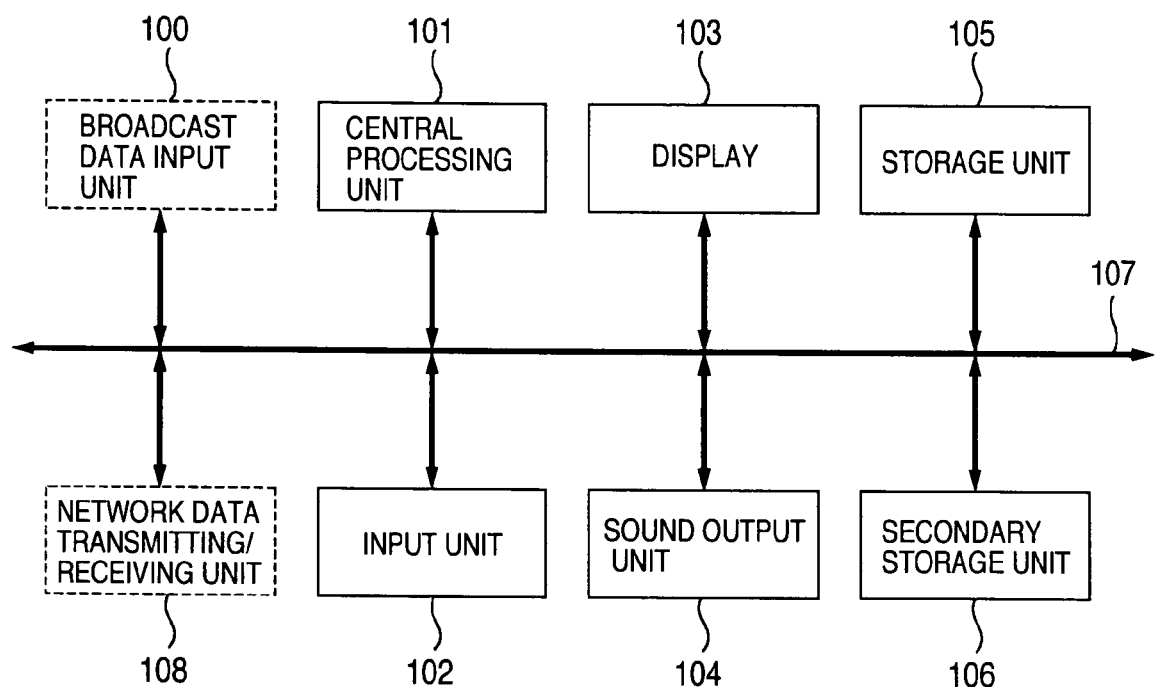
FIG. 1 shows an example of a hardware configuration of a motion picture recording/reproducing apparatus in accordance with this invention.

FIG. 1 shows an example of a hardware configuration of a motion picture recording/reproducing apparatus in accordance with an embodiment 1 of this invention.

As shown in FIG. 1, the motion picture recording/reproducing apparatus of the embodiment 1 includes a central processing unit 101, an input unit 102, a display unit 103, a sound output unit 104, a storage unit 105, and a secondary storage unit 106. When it is desired to acquire motion picture data or an electronic program guide via a network, the motion picture recording/reproducing apparatus further includes a data transmitting/receiving unit 108. When broadcast data is received to acquire the motion picture data or the electronic program guide, the motion picture recording/reproducing apparatus further includes a broadcast data input unit 100. And the units are arranged to be connected by a bus 107 to transmit or receive data to or from the units.

The central processing unit 101, which has a microprocessor as a main component, executes a program stored in the storage unit 105 or in the secondary storage unit 106.

The input unit 102 is realized in the form of a remote controller, a keyboard, or a pointing device such as a mouse. Through the input unit 102, the user sets the operation of the motion picture recording/reproducing apparatus with respect to the recording and reproduction of a motion picture. Through the input unit 102, the user also can specify a category for the motion picture data.

The display unit 103 is realized, for example, by combining a display adaptor and a liquid crystal panel, a projector or the like. The display unit 103 functions to display a reproduction image or the like for motion picture data in the motion picture recording/reproducing apparatus.

The sound output unit 104 is realized in the form of, for example, a sound speaker, and functions to output a sound included in the motion picture data.

The storage unit 105 is realized in the form of, for example, a random access storage (RAM) or a read only storage (ROM). The storage unit 105 is used to store a program to be executed by the central processing unit 101 or data, motion picture data or the like to be processed in the motion picture recording/reproducing apparatus.

The secondary storage unit 106 is realized in the form of, for example, a hard disk, DVD or CD and a drive thereof, or a nonvolatile storage such as a flash storage. The secondary storage unit 106 is provided to store a program to be executed by the central processing unit 101 or data or motion picture data to be processed in the motion picture recording/reproducing apparatus.

The broadcast data input unit 100, which is realized in the form of a television tuner or the like, can input motion picture data being broadcast by a television or the like. When it is desired to acquire an electronic program guide from the broadcast data, the broadcast data input unit 100 can acquire data about the electronic program guide.

The data transmitting/receiving unit 108, which is realized in the form of a network card such as a LAN card, functions to input the motion picture data or the data about the electronic program guide from the other units connected through the network.

FIG. 2 is a functional block diagram of the embodiment 1 of this invention. Some or all of functional blocks of FIG. 2 may be realized in the form of hardware in addition to the hardware shown in FIG. 1, or may be realized as a software program to be executed by the central processing unit 101. In the following explanation, it is assumed, as an example, that all of these functional blocks are realized in the form of a software program to be executed by the central processing unit 101.

As shown in FIG. 2, the motion picture recording/reproducing apparatus of the embodiment 1 includes a recording block 201, a feature generating block 202, a ranking generating block 203, and a reproducing block 204.

The recording block 201 records motion picture data externally input. The recording block 201 has a recording motion-picture data input section 211, a video section 212, a recording section 213, a category acquiring section 214, a category table generating section 215, and a category data holding section 216.

The recording motion-picture data input section 211 is activated by the video section 212 to input motion picture data to be recorded from the broadcast data input unit 100 or the data transmitting/receiving unit 108. When it is desired to input the motion picture data from the broadcast data input unit 100, the recording motion-picture data input section 211 acquires motion picture data being broadcast from a specified channel according to an instruction of the video section 212 (to be explained later), converts the motion picture data to digital data, and then stores the digital data in the storage unit 105. When it is desired to input the motion picture data from the data transmitting/receiving unit 108, on the other hand, the recording motion-picture data input section 211 acquires the motion picture data via the network from the specified unit according to an instruction of the video section 212 (to be explained later), and stores the motion picture data in the storage unit 105. At this time, the acquisition of the motion picture data may be realized by using the HTTP or FTP protocol already known.

The video section 212 is activated when the user instructs the video section to start the recording from the input unit 102. At this time, the video section 212 inputs the motion picture data from the broadcast data input unit 100 or the data transmitting/receiving unit 108 via the recording motion-picture data input section 211, and stores the motion picture in the secondary storage unit 106 under control of the recording section 213. When the motion picture data is inputted from the broadcast data input unit 100, the video section 212 sets a preset channel or a channel specified by the user for the broadcast data input unit 100 through the recording motion-picture data input section 211, inputs the motion picture data of the channel, and stored the input data in the secondary storage unit 106 under control of the recording section 213. In this case, the input motion picture data may be compressed based on a compression system such as MPEG, and then be stored in the secondary storage unit 106. When the motion picture data is inputted from the data transmitting/receiving unit 108, on the other hand, the video section 212 sets a preset URI or a URI specified by the user for the data transmitting/receiving unit 108 through the recording motion-picture data input section 211, inputs motion picture data about the URI, and then stores the input motion picture data in the secondary storage unit 106 under control of the recording section 213. The video section 212 acquires a category (drama, baseball, soccer, etc.) for the input motion picture data under control of the category acquiring section 214 (to be explained later), generates a category table to associate the category with motion picture data recorded in the secondary storage unit 106, and holds the generated category table in the category data holding section 216.

The recording section 213 stores the input motion picture data from the recording motion-picture data input section 211 in the secondary storage unit 106 according to an instruction from the video section 212. At this time, the recording section 213 applies a unique file name to the recording motion picture data.

The category acquiring section 214 acquires a category for the input motion picture data from the recording motion-picture data input section 211 according to an instruction from the video section 212. More specifically, when the data about the electronic program guide including information on the motion picture data in question is already acquired, the category acquiring section 214 acquires the category for the motion picture data from the electronic program guide data. When the data of the electronic program guide is not acquired yet, on the other hand, the category acquiring section 214 newly acquires data about an electronic program guide including information on the motion picture data, and thereafter acquires the category of the motion picture data from the electronic program guide data. In this connection, the electronic program guide data may be acquired as data about the electronic program guide included in the broadcast data or as data about an electronic program guide provided by another server via the network under control of the data transmitting/receiving unit 108, and be stored in the storage unit 105 or the secondary storage unit 106. Explanation will now be made as to the structure of data on an electronic program guide. More specifically, when it is desired to input motion picture data from the broadcast data input unit 100, the category acquiring section 214 may decide whether or not the data about the electronic program guide corresponding to a record start time and a channel is stored in the storage unit 105 or in the secondary storage unit 106 on the basis of information about the start time and the channel. When such data is already stored, the category acquiring section 214 may acquire a corresponding category from the data about the electronic program guide with use of the information about the start time and the channel as a keyword.

When the data is not stored yet, on the other hand, the category acquiring section 214 may acquire data about an electronic program guide being broadcast on a predetermined channel through the broadcast data input unit 100, or may acquire data about an electronic program guide from a predetermined URI through the data transmitting/receiving unit 108 and then acquire a corresponding category with use of a recording start time and a channel from the data of the electronic program guide. This means that, when the data about the electronic program guide including information on the input motion picture data is not acquired yet, the apparatus acquire the data of the electronic program guide with use of the recording start as a trigger. Or the category acquiring section 214 may employ the category specified by the user as a category for the input motion picture data. Even when the motion picture data is acquired through the network under control of the data transmitting/receiving unit 108, if the data is broadcast data, then the category acquiring section 214 may employ the electronic program guide data or the category specified by the user mentioned above as a category for the input motion picture data. When the category of the motion picture data in question is included in a predetermined URI or in the URI of the motion picture data, then the category acquiring section 214 may acquire such data and employ it as a category.

The category table generating section 215, when activated by the video section 212, generates a category table (to be exemplified later) by relating the motion picture data (i.e., recorded motion picture data) stored in the secondary storage unit 106 to its category, i.e., the category of the input motion picture data acquired by the category acquiring section 214, and then stores the category table in the storage unit 105 or in the secondary storage unit 106 under control of the category data holding section 216. The category table generating section 215 and the category table are provided so that the user can refer to the category of the recorded motion picture data anytime after the recording is completed. When the recorded motion picture data is associated with its category as when feature data and ranking about motion picture data being recorded or already recorded are generated simultaneously with the recording or continuously after completion of the recording, the category table generating section 215 may hold the category acquired by the category acquiring section 214 directly in the category data holding section 216 (to be explained later). In this case, the category table generating section 215 and the category table is not necessarily required. Or the category table generating section 215 may associate the recorded motion picture data with its category, for example, by applying the identical file name of the recorded motion picture data also to the file name in the stored category data. In this case, the category table is not necessarily required.

The category data holding section 216, when receiving an instruction from the video section 212, stores the category table generated by the category table generating section 215 in the storage unit 105 or in the secondary storage unit 106. When the recorded motion picture data is associated with its category as when the feature data and ranking about the motion picture data being recorded or already recorded are associated with each other simultaneously with the recording or continuously after the recording is completed as mentioned above, the category data holding section 216 may store the category acquired by the category acquiring section 214 in the storage unit 105 or in the secondary storage unit 106 as it is. When the category table generating section 215 links the recorded motion picture data to its category, for example, by applying the identical file name of the recorded motion picture data to the file name of the stored category data, the category data holding section 216 may store the category data of the motion picture data with the same file name as that of the recorded motion picture data, that is, data about the category acquired by the category acquiring section 214 in the storage unit 105 or in the secondary storage unit 106.

Explanation will be made as to the feature generating block 202. The feature generating block generates a feature of input motion picture data or of motion picture data to be reproduced. The feature generating block 202 has an analysis motion picture data input section 221, a feature generating section 222, and a feature data holding section 223.

The analysis motion picture data input section 221 inputs motion picture data to be subjected to highlight reproduction from the storage unit 105 or the secondary storage unit 106. At this time, the file name for the motion picture data is acquired. The analysis motion picture data input section 221 is activated, after the recording start, after the recording completion, when the analysis motion picture data input section receives an instruction from the user to generate feature data or ranking data, or when the reproduction is started, or when a not shown scheduler finds motion picture data having the feature data or the ranking data not generated. Or the analysis motion picture data input section 221 may be activated when the recording is started. In this case, the analysis motion picture data input section 221 may input motion picture data from the video section 212 or motion picture data being recorded. At this time, a file name for the motion picture data being recorded is acquired.

The feature generating section 222 generates a feature of the motion picture data received in the analysis motion picture data input section 221. This can be realized, for example, by generating sound power, image motion, etc. for each frame of sound data and image data in motion picture data. When the analysis motion picture data input section 221 is executed, the feature generating section 222 is executed whenever receiving the motion picture data therefrom.

The feature data holding section 223 holds the feature data generated by the feature generating section 222. This can be realized, for example, by storing the feature data generated by the feature generating section 222 in the storage unit 105 or in the secondary storage unit 106. At this time, the same file name as that of the recording motion picture data acquired in the analysis motion picture data input section 221 is applied to the feature data to be held. In this connection, when the feature generating section 222 is executed, the feature data holding section 223 may be arranged to be executed each time the feature data is generated or feature data corresponding to one frame is generated.

The ranking generating block 203 will next be explained. The ranking generating block 203 provides ranking of scenes in input motion picture data or in motion picture data to be reproduced according to the importance level. The ranking generating block 203 has a feature data input section 231, a category data input section 232, a ranking generating section 233, a ranking data holding section 234, and ranking generators 235 to 237 for categories of the motion picture data.

The feature data input section 231 inputs the feature data held in the feature data holding section 223. This can be realized, for example, by reading out feature data stored in the storage unit 105 or in the secondary storage unit 106 therefrom. At this time, a file name for the feature data is acquired. The feature data input section 231 may be executed when the ranking generating section 233 is executed.

The category data input section 232 acquires category data for the recording motion picture data to be subjected to ranking provision. In the illustrated example, the recording motion picture data is set to have the same file name as the feature data as mentioned above. Thus, the acquisition of category data corresponding to the recording motion picture data can be realized by acquiring the corresponding category from the category table held in the storage unit 105 or in the secondary storage unit 106 by the category data holding section 216, as will be mentioned later. The category data input section 232 may be executed when the ranking generating section 233 (to be explained later) is executed.

The ranking generators 235 to 237 generate ranking data corresponding to the categories of the motion picture data. In the illustrated example, the ranking generators are for Sumo, soccer and drama, respectively. The ranking generators for the respective categories, when activated by the ranking generating section 233 (to be explained later) according to the categories of the motion picture data, extract important scenes in the motion picture data and provide ranking thereof on the basis of the feature data inputted from the feature data input section 231. The ranking provision may use an algorithm optimum for the category. For example, when the motion picture data has a Sumo category, the importance level to a predetermined number of scenes from a time point of appearance of a wrestling caption is increased and a higher importance level is applied to one of the scenes having a strong sound level. When the motion picture data is of a soccer category, the importance levels of scenes before and after the scene having a strong sound level are increased. When the motion picture data has a drama category, such a method as cited in the earlier-mentioned non-patent Literature 1 is employed.

The ranking generating section 233 activates one of the ranking generators according to the category of the motion picture data input in the category data input section 232 to extract important scenes optimum for the category of the motion picture data and to provide ranking of the scenes. The ranking generating section 233 may be arranged to be activated after the recording start, after completion of the recording, after completion of the generation of the feature data, when the user instructs to generate ranking data, when the reproduction is started, or when a not-shown scheduler finds motion picture data having ranking data not generated.

The ranking data holding section 234 holds the ranking data generated in the ranking generating section 233. This can be realized, for example, by storing the ranking data generated in the ranking generating section 233 in the storage unit 105 or in the secondary storage unit 106. When the ranking generating section 233 is executed, the ranking data holding section 234 may be arranged to be executed each time the ranking data is generated.

Explanation will then be made as to the reproducing block 204. The reproducing block 204 performs highlight reproduction on motion picture data to be reproduced. The reproducing block 204 has a ranking data input section 241, a reproducing motion-picture data input section 242, a reproduction-scene deciding parameter input section 243, a reproduction scene deciding section 244, a reproducing section 245, a display section 246, and a sound output section 247.

The ranking data input section 241 receives the ranking data held in the ranking data holding section 234. This can be realized, for example, by reading out the ranking data stored in the storage unit 105 or in the secondary storage unit 106 therefrom. The ranking data input section 241 may be arranged to be activated when the reproduction scene deciding section 244 (to be explained later) is executed.

The reproduction-scene deciding parameter input section 243 inputs a parameter when a reproduction scene in the highlight reproduction is decided, from the input unit 102 of the user. In this connection, the parameter is, for example, a viewing time for the motion picture data in the highlight reproduction. The reproduction-scene deciding parameter input section 243 is executed when the highlight reproduction is carried out in the reproducing section 245 (to be explained later).

The reproduction scene deciding section 244 decides a reproduction scene in the highlight reproduction on the basis of the parameter input in the reproduction-scene deciding parameter input section 243 and the ranking data input in the ranking data input section 241. How to decide a reproduction scene in this case will be explained later. The reproduction scene deciding section 244 is executed after the parameter upon decision of the reproduction scene of the highlight reproduction in the reproduction-scene deciding parameter input section 243 is inputted.

The reproducing motion-picture data input section 242 inputs the motion picture data to be reproduced from the secondary storage unit 106. The reproducing motion-picture data input section 242 is started when the reproducing section 245 (to be explained later) acquires the motion picture data to be reproduced.

The reproducing section 245 inputs the motion picture data of the reproduction scene decided by the reproduction scene deciding section 244 from the reproducing motion-picture data input section 242, generates a reproduction image, and displays the reproduction image on the display section 246 (to be explained later). The reproducing section 245 is executed when the user instructs the highlight reproduction.

The display section 246 displays the reproduction image generated in the reproducing section 245 on the display unit 103. The display section 246 displays the reproduction image generated by the reproducing section 245 on the display unit 103 on a frame-by-frame basis. In this case, the display section 246 may be arranged to be activated each time the reproducing section 245 generates the reproduction image corresponding to one frame.

The sound output section 247 outputs a reproduction sound generated in the reproducing section 245 to the sound output unit 104. The sound output section 247 can be realized by outputting the reproduction sound generated by the reproducing section 245 to the sound output unit 104 on a frame-by-frame basis. In this case, the sound output section 247 may be arranged to be activated each time the reproducing section 245 generates the reproduction sound corresponding to one frame.

Explanation will next be made as to data about an electronic program guide acquired in the category acquiring section 214.

FIG. 3 shows an example of a data structure of an electronic program guide acquired in the category acquiring section 214 according to the embodiment 1 of this invention.

In FIG. 3, broadcast programs or motion picture data are denoted by reference numerals 306 to 309. Each of the broadcast programs or the motion picture data contains, at least, a date 300 on which the motion picture data program is broadcast, a channel 301, a broadcast start time 302, a broadcast end or broadcast time 303, a title 304, and a category 305. Accordingly, the category acquiring section 214 can decide whether or not the data corresponding to the motion picture data is present in the data about the electronic program guide on the basis of information about the recording start date, time and channel. A category for the motion picture data to be recorded can be acquired by acquiring the corresponding category from the electronic program guide data with use of the information about the recording start date, time and channel as keys. The structure of the electronic program guide data is illustrated merely as an example. Therefore, the data may be grouped into different files according to the broadcast date, or may be grouped into different files according to the broadcast channel. Even in such a case, the presence of data corresponding to the motion picture data in the electronic program guide data can be confirmed and the category therefore can be acquired with use of the information of date, time and channel as keywords.

Explanation will then be made as to the data structure of a category table generated in the category table generating section 215.

FIG. 4 shows an example of a data structure of a category table generated in the category table generating section 215 in the embodiment 1 of this invention.

In FIG. 4, pieces of recorded motion picture data are denoted by reference numerals 403 to 406. Each of the pieces of motion picture data contains, at least, a file name 401 for the recorded motion picture data and a category 402 therefor. Accordingly, a category for the recorded motion picture data can be acquired by acquiring the corresponding category data in the category data input section 232 with use of the file name of the recorded motion picture data as a keyword. In this connection, it is assumed in the motion picture recording/reproducing apparatus of the embodiment 1 that the feature data generated in the feature generating section 222 is set to have the same file name as the recorded motion picture data in the feature data holding section 223. And the feature data input section 231 acquires the feature data and its file name and the ranking generating section 233 acquires these data. For this reason, when the ranking generating section 233 informs the category data input section 232 of the file name of the feature data, the category data input section 232 can acquire a category for the recorded motion picture data on the basis of the file name of the feature data.

Explanation will next be made as to the data structure of ranking data generated in the ranking generating section 233.

FIG. 5 shows an example of the structure of ranking data generated in the ranking generating section 233 in the embodiment 1 of this invention.

In FIG. 5, pieces of motion picture data are denoted by reference numerals 504 to 508. Reference numeral 501 denotes an importance level or rank in each scene. In this example, it is assumed for the sake of the convenience of explanation that the smaller the numeral value is the higher the rank is. Numerals 502 and 503 denote a start position and an end position 503 for each scene, which are expressed in seconds, respectively. The ranking generators for the categories of motion picture data, when activated by the ranking generating section 233, extract scenes in the motion picture data, provide ranking of the scenes, acquire a time of the start position and a time of the end position. In this manner, the illustrated data structure is generated. In this connection, when the motion picture data is an MPEG stream for example, the times of the start and end positions for each scene can be acquired by acquiring a time stamp corresponding to the frame. Based on this ranking data, the reproduction scene deciding section 244 can refer to the rank and reproduction time of each scene and decide a scene to be reproduced.

A processing flow of each functional block will then be explained.

Figure 6:
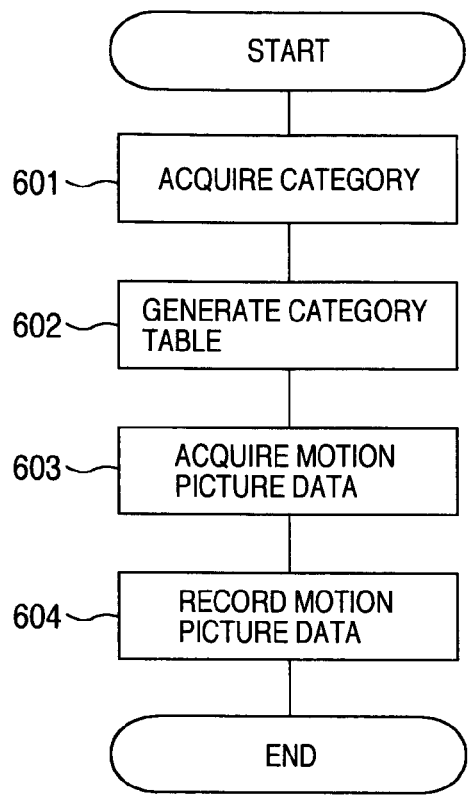
FIG. 6 is a flow chart for explaining the operation of a recording block 201 in the embodiment 1.

FIG. 6 is a flow chart for explaining the operation of the recording block 201 in the embodiment 1 of this invention.

When the user issues an instruction from the input unit 102 to start the recording, the recording block 201 is operated according to an instruction from the video section 212. As shown in FIG. 6, in the recording block 201, the category acquiring section 214 first acquires a category for input motion picture data (step 601). The category table generating section 215 then links the recording input motion picture data to its category, i.e., to the category acquired by the category acquiring section 214 in the step 601, generates a category table (step 602). And the category data holding section 216 holds the generated category table. Subsequently, the recording motion-picture data input section 211 inputs the motion picture data to be recorded (step 603), and the recording section 213 records the input motion picture data to be recorded in the secondary storage unit 106 (step 604). At this time, a unique file name is applied to the recording motion picture data. The input motion picture data may be compressed based on a compression system such as MPEG and be stored in the secondary storage unit 106.

Figure 7:
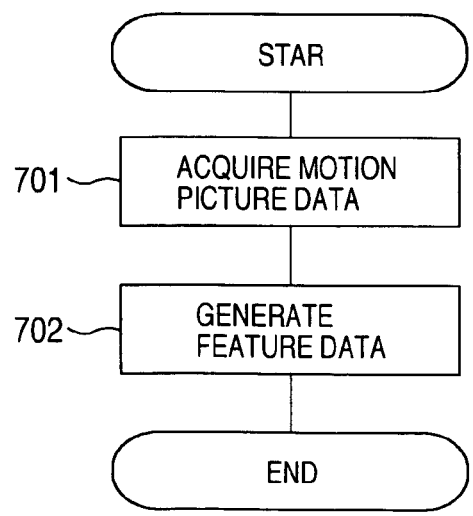
FIG. 7 is a flow chart for explaining the operation of a feature generating block 202 in the embodiment 1.

FIG. 7 is a flow chart for explaining the operation of the feature generating block 202 in the embodiment 1 of this invention.

The feature generating block 202 is activated when after the start of the recording, after the end of the recording, or when the user issues an instruction to generate feature data or ranking data, or when the reproduction is started, or when a not-shown scheduler finds motion picture data having feature data and ranking data not generated. In the feature generating block 202, as shown in FIG. 7, the analysis motion picture data input section 221 first acquires motion picture data already recorded or being recorded (step 701). At this time, the analysis motion picture data input section 221 acquires a file name for the motion picture data. Subsequently, the feature generating section 222 generates a feature of the motion picture data input in the step 701 (step 702), and the feature data holding section 223 holds the generated feature data in the feature data holding section 223.

Figure 8:
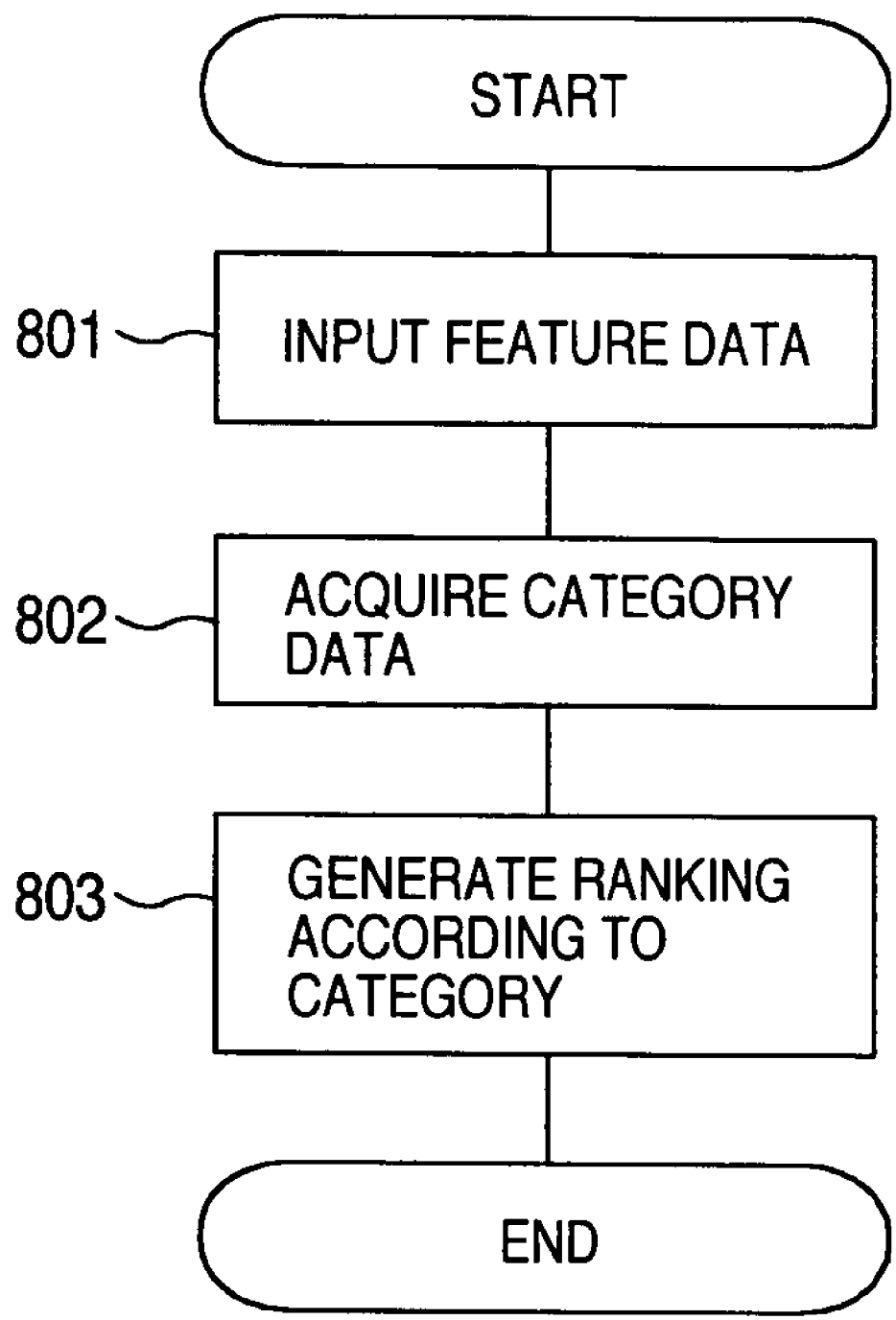
FIG. 8 is a flow chart for explaining the operation of a ranking generating block 203 in the embodiment 1.

FIG. 8 is a flow chart for explaining the operation of the ranking generating block 203 in the embodiment 1 of this invention The ranking generating block 203 is activated according to an instruction from the ranking generating section 233, after the start of the recording, after the end of the recording, when the user issues an instruction to generate ranking data, or when the reproduction is started, or when a not-shown scheduler finds motion picture data having ranking data not generated. In the ranking generating block 203, as shown in FIG. 8, the feature data input section 231 first inputs feature data (step 801). At this time, the feature data input section 231 acquires a file name for the feature data. Then the category data input section 232 acquires category data for the motion picture data to be subjected to ranking provision (step 802). In the illustrated example, the recording motion picture data is set to have the same file name as the feature data, as mentioned above. Thus, with respect to the acquisition of the category data for the recording motion picture data, the acquisition of the category data for the recording motion picture data to be subjected to ranking provision can be realized by acquiring the corresponding category data with use of the file name of the feature data acquired in the step 801 as a keyword. Next, one of the ranking generators corresponding to the category is activated to extract important scenes in the motion picture data and to provide ranking of the scenes (step 803), and the generated ranking data is held in the ranking data holding section 234.

Figure 9:
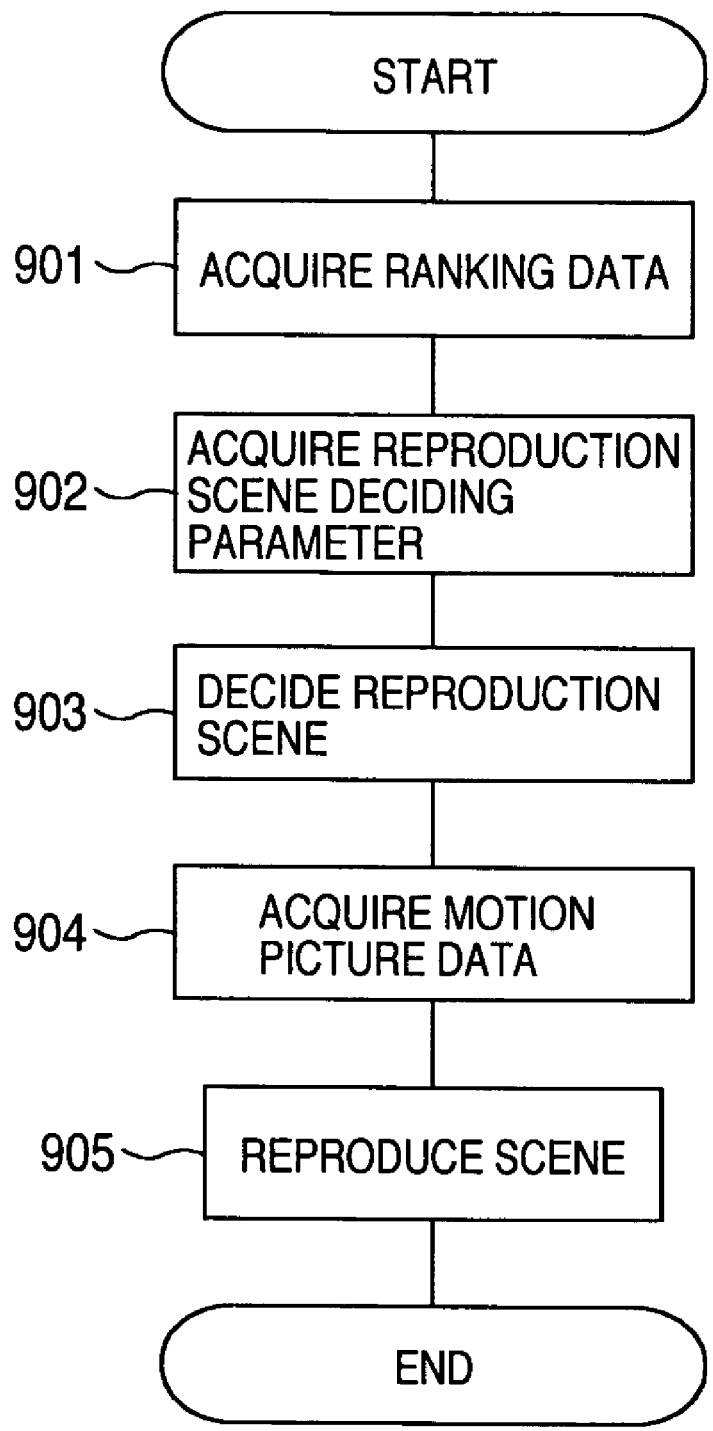
FIG. 9 is a flow chart for explaining the operation of a reproducing block 204 in the embodiment 1.

FIG. 9 is a flow chart for explaining the operation of the reproducing block 204 in the embodiment 1 of this invention.

The reproducing block 204 is executed according to an instruction from the reproducing section 245 when the user instructs highlight reproduction. In the reproducing block 204, as shown in FIG. 9, the ranking data input section 241 inputs ranking data (step 901), and the reproduction-scene deciding parameter input section 243 inputs a parameter when a reproduction scene is determined in highlight reproduction (step 902). The parameter is, for example, a viewing time in the highlight reproduction of the motion picture data. In the reproducing block 204, the reproduction scene deciding section 244 then decides a reproduction scene in highlight reproduction on the basis of the parameter input in the reproduction-scene deciding parameter input section 243 and the ranking data input in the ranking data input section 241 (step 903). The reproduction scene deciding method will be explained later. In the reproducing block 204, next, the reproducing motion-picture data input section 242 acquires the motion picture data about each reproduction scene (step 904), the display section 246 displays a reproduction image for such a scene on the display unit 103, and the sound output section 247 outputs a reproduction sound from the sound output unit 104 to reproduce each reproduction scene (step 905). The scene reproducing method will be explained later.

Explanation will next be made as to how to decide a reproduction scene in the reproduction scene deciding section 244.

Figure 10A:
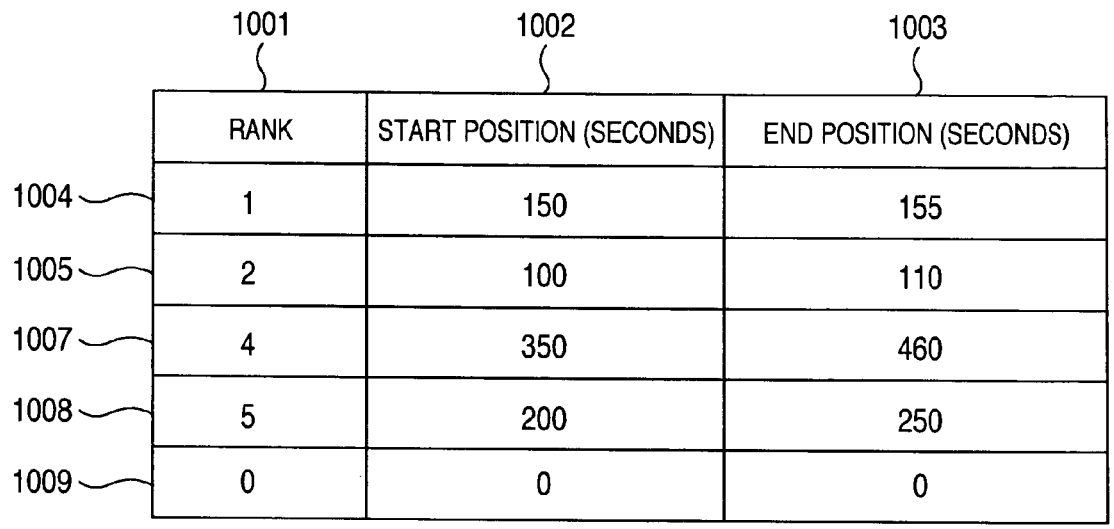
FIG. 10A shows an example of how to determine a reproduction scene and how data processing is transited in the embodiment 1.
Figure 10B:
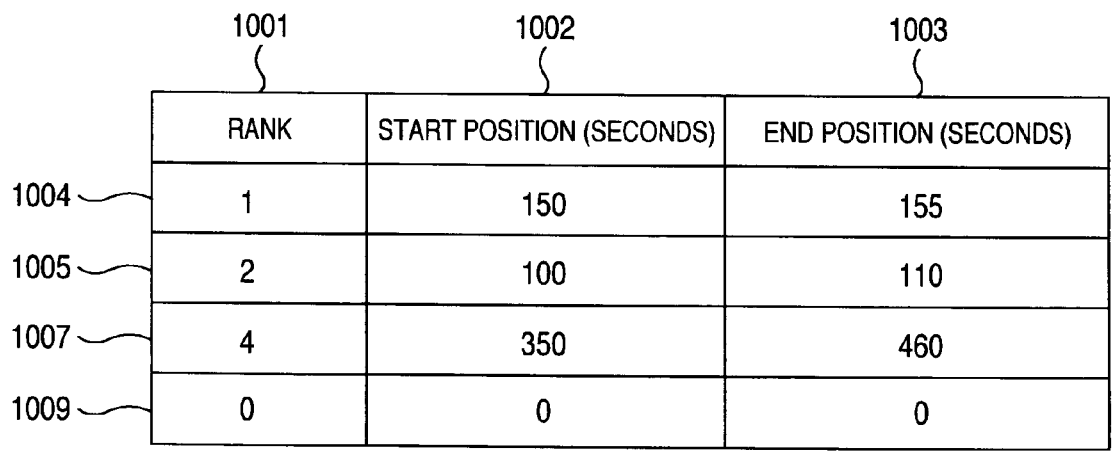
FIG. 10B shows another example of how to determine a reproduction scene and how data processing is transited in the embodiment 1.

In order to decide a reproduction scene, the reproduction scene deciding section 244 first acquires a position at which reproduction is currently carried out in the motion picture data. This can be realized by acquiring the time of a frame in the motion picture data being currently reproduced. Or when the motion picture data is now going to be reproduced, this can be realized by acquiring the time of the first frame in the motion picture data. When the motion picture data is of, for example, an MPEG stream, the frame time in the motion picture data can be realized by acquiring a time stamp corresponding to the frame in question. The reproduction scene deciding section 244 next decides a reproduction scene on the basis of the parameter acquired in the reproduction-scene deciding parameter input section 243, the ranking data generated in the ranking generating section 233, and the current reproduction position acquired in the above step. More specifically, for example, when the parameter acquired in the reproduction-scene deciding parameter input section 243 is a viewing time, scenes in the ranking data generated in the ranking generating section 233 having end positions smaller than the current reproduction positions are deleted as shown in FIG. 10A. FIG. 10A shows an example of the ranking data exemplified in FIG. 5 when the current reproduction position is 50 seconds. As shown in FIG. 10B, next, times for the scenes are accumulated in an decreasing order of rank, and reproduction scenes are listed to the extent that the accumulated time does not exceed the viewing time acquired in the reproduction-scene deciding parameter input section 243. That is, reproduction scenes are sequentially selected in a decreasing order of rank so that a total of the times of the reproduction scenes do not exceed the viewing time acquired in the reproduction-scene deciding parameter input section 243.

Figure 10C:
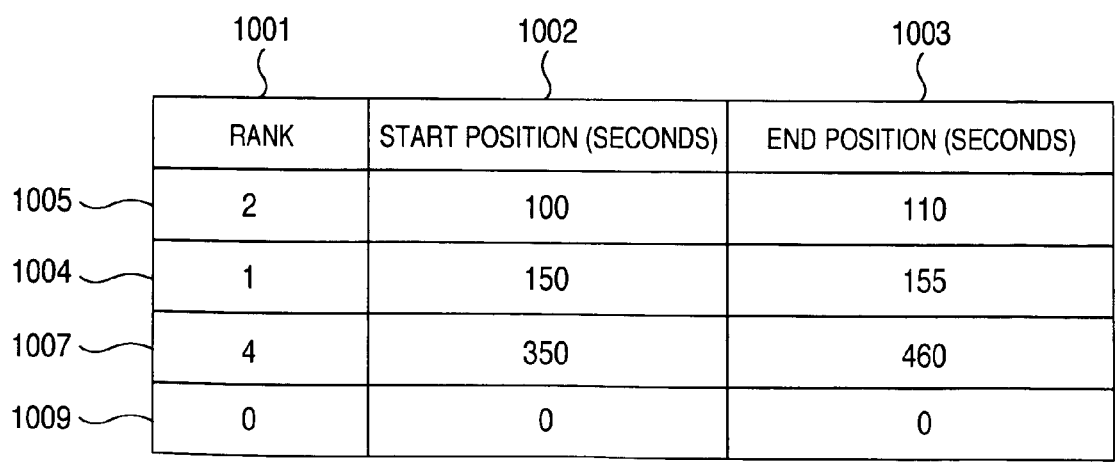
FIG. 10C shows a further example of how to determine a reproduction scene and how data processing is transited in the embodiment 1.

FIG. 10B shows the example when the viewing time acquired in the reproduction-scene deciding parameter input section 243 is 150 seconds, indicating that a total of three scenes (125 seconds in total) of a scene 1004 having a rank 1 (time: 5 seconds), a scene 1005 having a rank 2 (time: 10 seconds), and a scene 1007 having a rank 4 (time: 110 seconds) are selected as reproduction scenes. In this example, even a scene 1008 having a rank 5 may be shortened cutting its remaining 25-second part, and be selected as a reproduction scene as an option. In this case, a part of the scene 1008 corresponding to a time duration from the beginning to 25 seconds may be selected as a scene, or a part of the scene 1008 in a 25-second range including its central scene may be selected as a scene. Further, when the current reproduction position is in the middle of the scene, the time of the scene can be corrected to a time duration from the current reproduction position to the end position. In the example of FIG. 10, for example, when the current reproduction position is 105 seconds, calculation may be carried out based on the start position of the scene 1005 of the rank 2 being 105 seconds and the end position being 110 seconds. The reproduction scene deciding section 244 rearranges the decided reproduction scenes in the reproduction time order and decides each of the rearranged reproduction scenes as a final reproduction scene as shown in FIG. 10C.

Next how to reproduce the reproduction scene will be explained.

Figure 11:
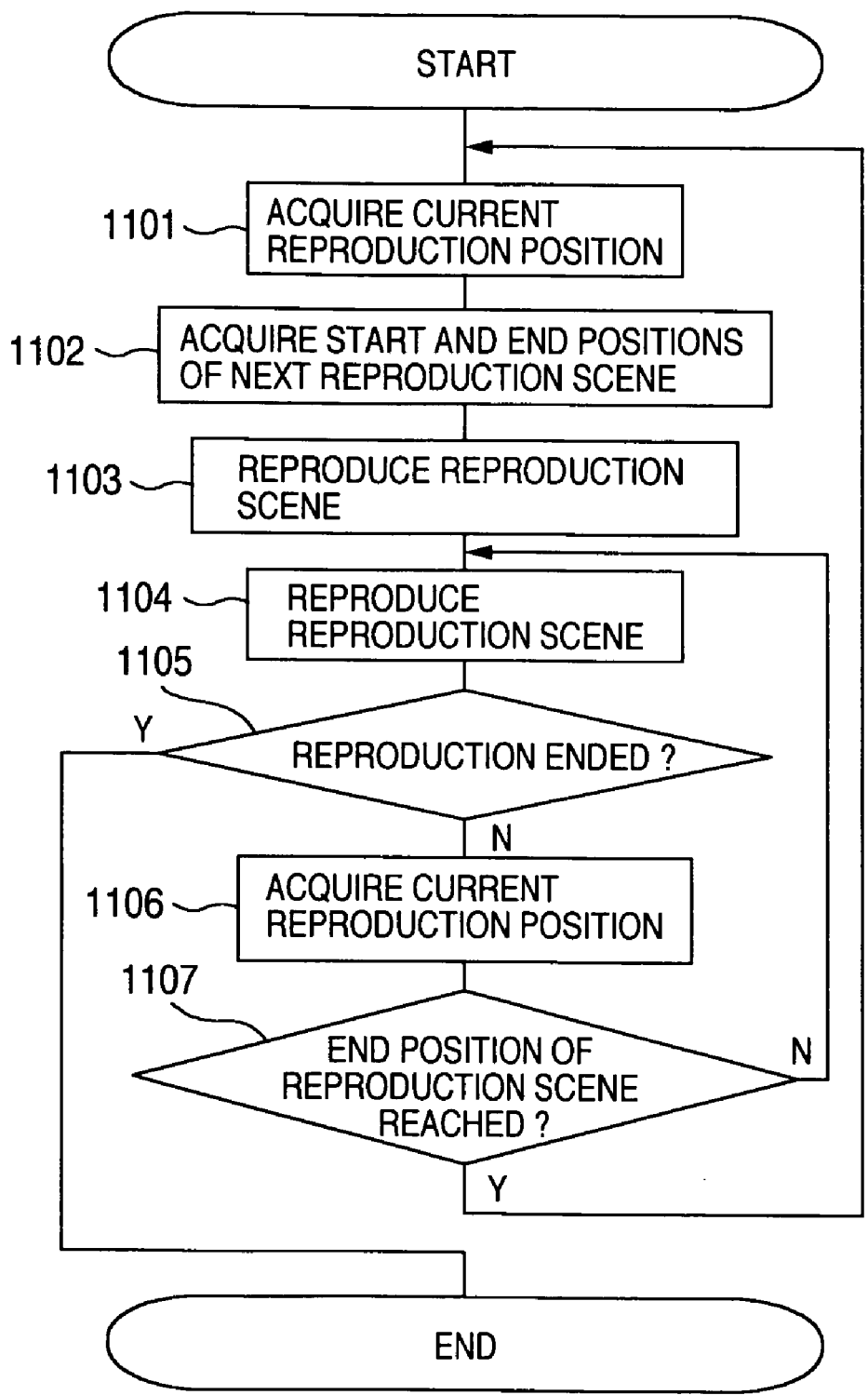
FIG. 11 is a flow chart for explaining how to reproduce a reproduction scene in the embodiment 1.

FIG. 11 is a flow chart for explaining how to reproduce a reproduction scene in the embodiment of this invention.

As shown in FIG. 11, when a reproduction scene is reproduced, the apparatus first acquires a current reproduction position thereof in motion picture data (step 1101), and the apparatus acquires the start and end positions of the next reproduction scene on the basis of the current reproduction position (step 1102). This can be realized by acquiring the start and end positions of a reproduction scene followed by the current reproduction position and nearest to the current reproduction position. Next, the apparatus jumps to the start position of the next reproduction scene acquired in the step 1102 (step 1103), and reproduces the reproduction scene (step 1104). This can be realized by displaying the reproduction image of the reproduction scene on the display unit 103 under control of the display section 246 and outputting the reproduction sound of the reproduction scene to the sound output unit 104 under control of the sound output section 247.

During the reproduction of the reproduction scene, the apparatus decides whether or not the reproduction was regularly terminated (step 1105). When deciding that the reproduction was terminated, the apparatus terminates the reproduction of the motion picture data. When all of the reproduction scenes decided in the reproduction scene deciding section 244 are fully reproduced and completed or when the user instructs the apparatus to terminate the reproduction, the apparatus decides the end of the reproduction. Otherwise, the apparatus continues to reproduce the reproduction scene. Further, during the reproduction of the reproduction scene, the apparatus regularly acquires the current reproduction position (step 1106), and decides whether or not the apparatus reached the end position of the reproduction scene (step 1107). This can be judged by comparing the end position of the reproduction scene acquired in the step 1102 with the current reproduction position acquired in the step 1106. When deciding as the decision result of the step 1107 that the apparatus failed to reach the end position of the reproduction scene, the apparatus repeats the steps 1104 to 1107 to continue to reproduce the reproduction scene. When deciding as a result in the step 1107 that the apparatus reached the end position of the reproduction scene, on the other hand, the apparatus repeats the steps 1101 to 1107 to sequentially reproduce the reproduction scenes decided in the reproduction scene deciding section 244. And the apparatus finishes reproducing all the reproduction scenes decided in the reproduction scene deciding section 244, the apparatus recognized it in the step 1105 and terminates its reproduction. As a result, only the reproduction scenes decided in the reproduction scene deciding section 244 can be sequentially reproduced while jumping to each reproduction scene.

Finally, explanation will be made as to a general flow of operation of the motion picture recording/reproducing apparatus from its recording to reproduction.

Figure 12:
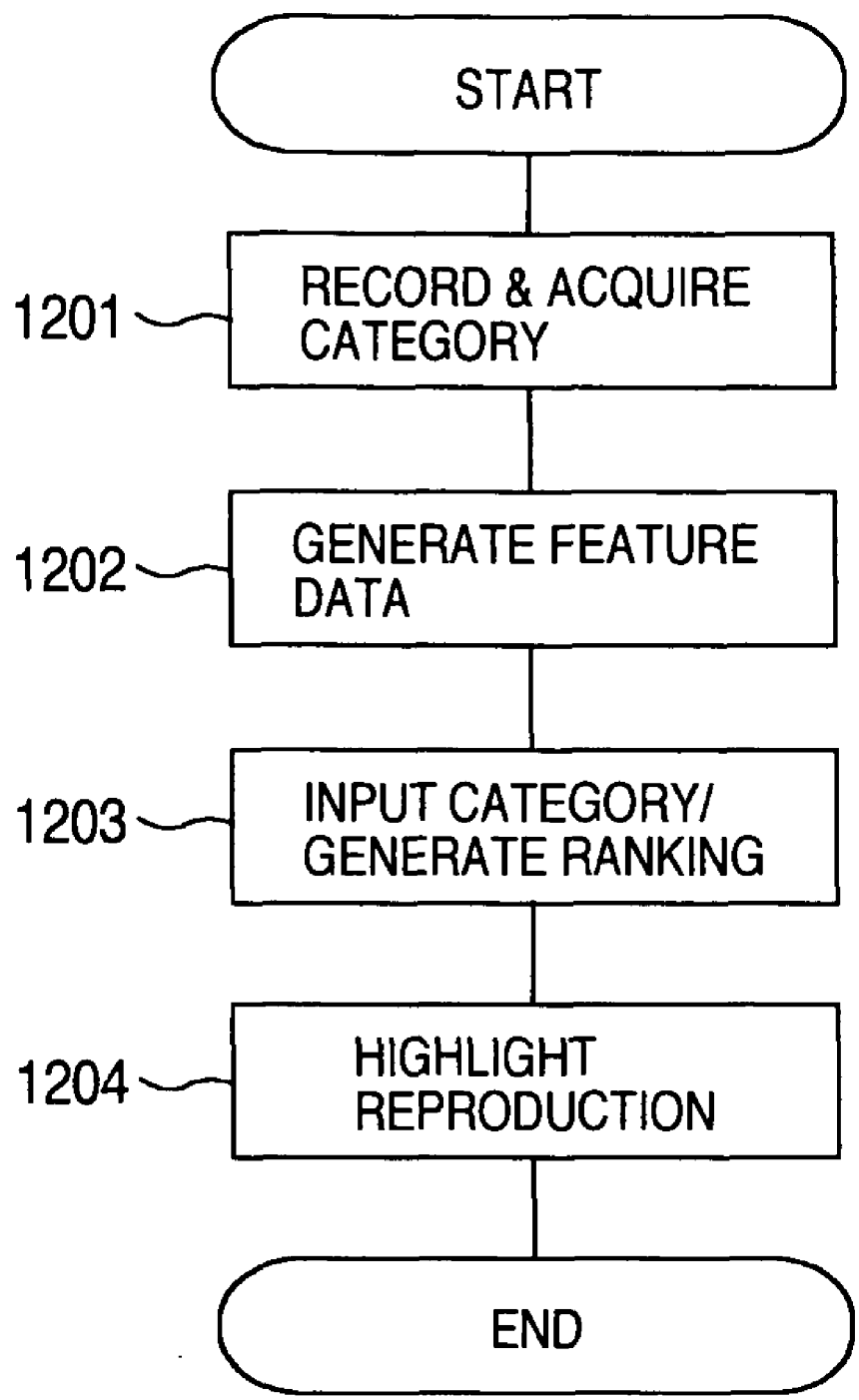
FIG. 12 is a flow chart for explaining a flow of operation from recording to reproducing in the embodiment 1.

FIG. 12 shows an exemplary flow chart for explaining a flow of operation of the embodiment 1 of this invention from its recording to reproduction.

As shown in FIG. 12, when the user instructs the motion picture recording/reproducing apparatus to record, the apparatus records input motion picture data under control of the recording block 201, acquires a category thereof (step 1201), and generates feature data of the input motion picture data under control of the feature generating block 202 (step 1202). And the ranking generating block 203 acquires the category of the input motion picture data or recording motion picture data acquired in the recording block 201, and provides ranking of scenes in the motion picture data according to the category (step 1203). In this connection, the steps 1201 to 1203 may be carried out sequentially after each step ends, or may be sequentially carried out, for example, on a frame-by-frame basis in the motion picture data. And when the user specifies the highlight reproduction, the reproducing block 204 decides a reproduction scene on the basis of the ranking data generated in the step 1203, and realizes the highlight reproduction by reproducing only the reproduction scene (step 1204).

As mentioned above, since the motion picture recording/reproducing apparatus of the embodiment 1 of this invention acquires data about an electronic program guide, decides a category, and decides a reproduction scene according to the category, the apparatus can realize optimum highlight reproduction according to the category of motion picture data.

Further, the apparatus can realize optimum highlight reproduction on the basis of a category specified by the user.

Embodiment 2

Figure 13:
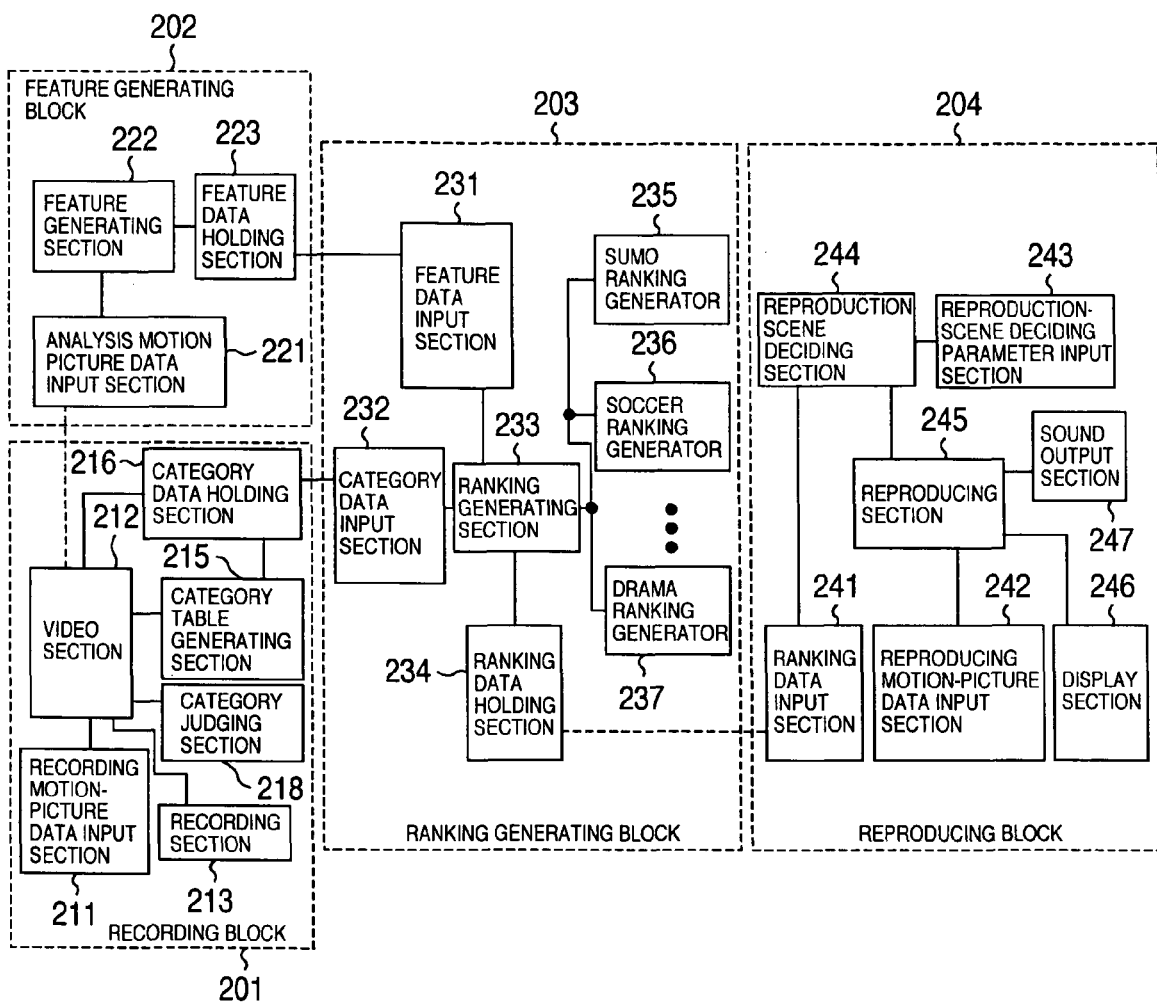
FIG. 13 is a functional block diagram of an embodiment 2 of this invention.

FIG. 13 is a functional block diagram of an embodiment 2 of this invention.

As shown in FIG. 13, a motion picture recording/reproducing apparatus in accordance with the embodiment 2 includes a category judging section 218 in place of the category acquiring section 214 in the motion picture recording/reproducing apparatus of the embodiment 1.

The category judging section 218, which has a sound recognition engine not shown, recognizes a sound in input motion picture data, lists ones of previously registered keywords which appear therein, counts their keyword appearance frequencies, and decides a category according the keyword appearance frequencies. For example, when "strike", "shoot", etc. are previously registered as keywords and when a frequency of the "strike" is counted to be higher than a frequency of the "shoot", the category judging section 218 decides the category as "baseball". Similarly, when a frequency of the "shoot" is counted to be higher than a frequency of the "strike", the category judging section 218 decides the category as "soccer". And when no registered keywords appear, the apparatus can decide the category as a category other than the "baseball" and "soccer". The category judging section 218 may have a caption acquiring part not shown). In this case, the caption acquiring part acquires caption information being sent together with the motion picture data. Similarly to the case of the use of the afore-mentioned sound recognition engine, the category judging section 218 lists ones of previously registered keywords which appear therein, counts the appeared keywords, and decides the category according to the keyword appearance frequencies. Further, the category judging section 218 may have a caption image recognition engine not shown. In this case, the caption image recognition engine acquires a caption image overlaid on an image in the motion picture data and recognizes characters of the caption. As in the case of the use of the afore-mentioned sound recognition engine, the category judging section 218 lists ones of previously registered keywords which appear therein, counts their appearance frequencies, and decides the category according to the keyword appearance frequencies. In this connection, known techniques can be applied to the above sound recognition engine, caption acquiring part, and caption image recognition engine.

Figure 14:
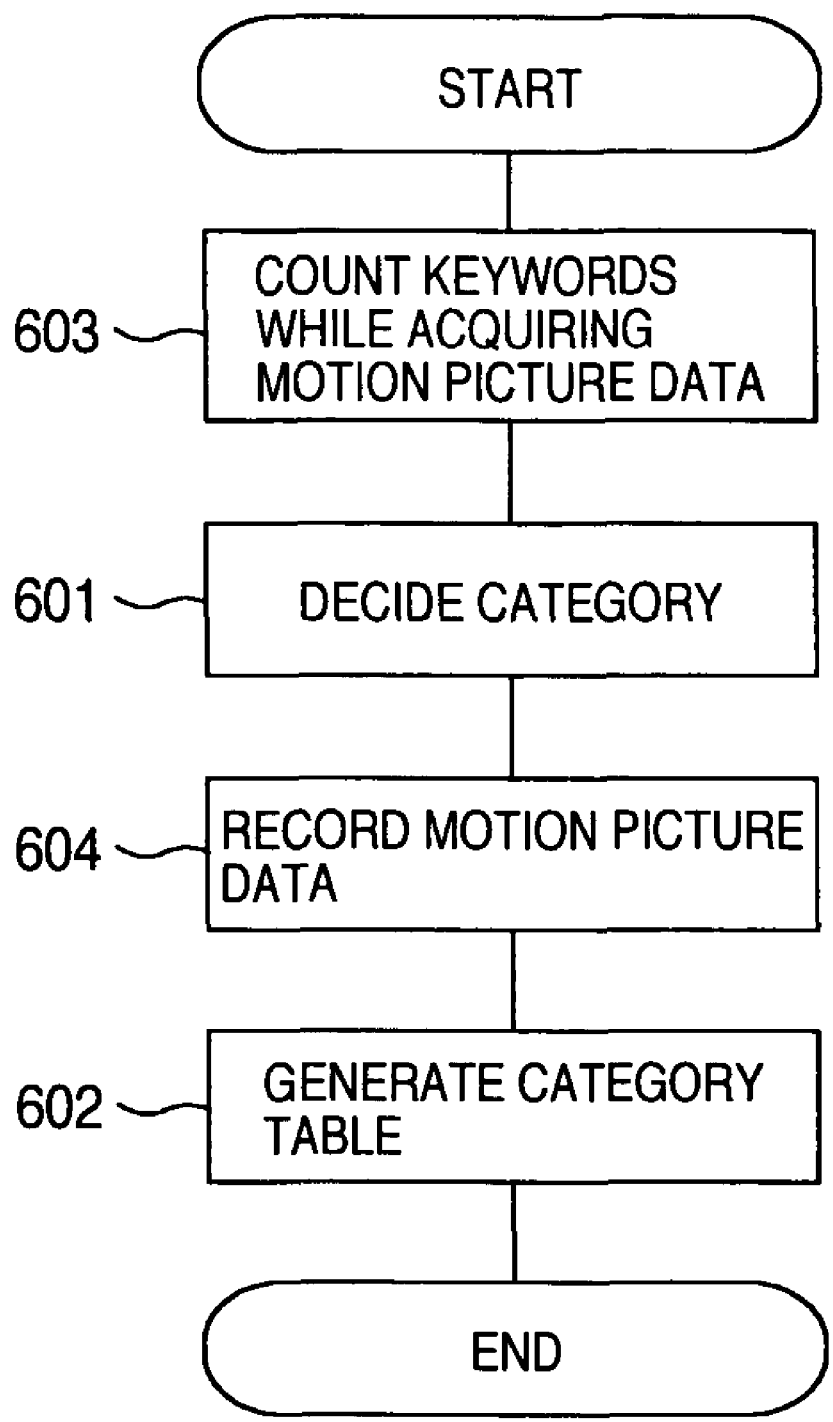
FIG. 14 is a flow chart for explaining the operation of a recording block 201 in the embodiment 2.

FIG. 14 is a flow chart for explaining the operation of the recording block 201 in the embodiment 2 of this invention.

As shown in FIG. 14, a flow of operation of the recording block 201 in the motion picture recording/reproducing apparatus of the embodiment 2 is different from a flow of operation of the recording block 201 in the motion picture recording/reproducing apparatus of the embodiment 1, in that the category judging section 218 counts frequencies of keywords on the basis of the motion picture data (step 603'). And the category judging section 218 acquires all the motion picture data, counts frequencies of keywords, decides the category according to the counted keyword appearance frequencies (step 601'), records the motion picture data (step 604), and generates a category table on the basis of the decided category (step 602).

As a result, the motion picture recording/reproducing apparatus of the embodiment 2 can decide the category without acquiring data about an electronic program guide and can realize optimum highlight reproduction according to the category of the motion picture data.

Embodiment 3

Figure 15:
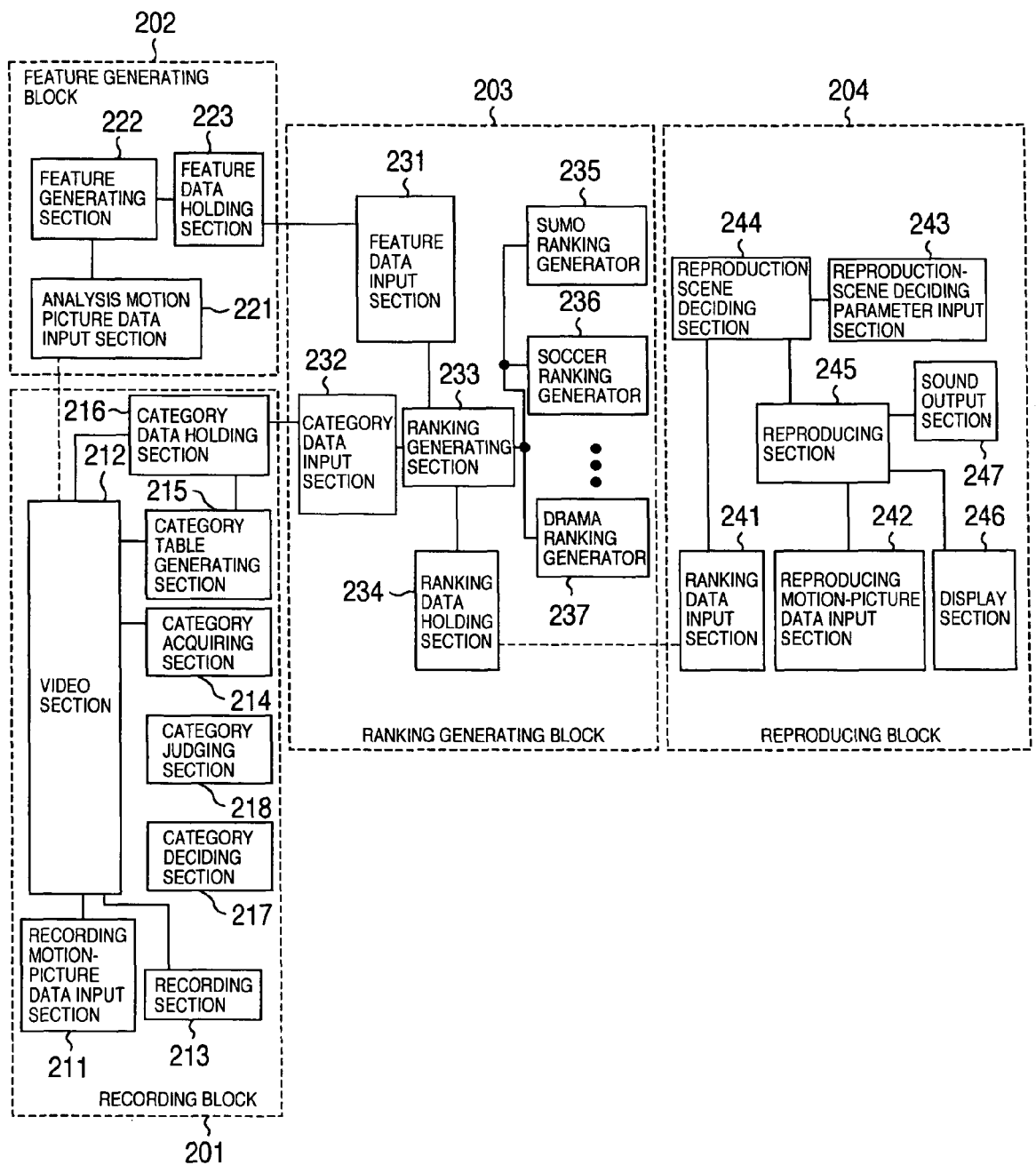
FIG. 15 is a functional block diagram of an embodiment 3 of this invention.

FIG. 15 is a function block diagram of an embodiment 3 of this invention.

As shown in FIG. 15, the motion picture recording/reproducing apparatus of the embodiment 3 corresponds the motion picture recording/reproducing apparatus of the embodiment 1, but adds a category deciding section 217 and the category judging section 218 already explained in the embodiment 2.

When the category acquiring section 214 fails to acquire a category for input motion picture data, the category deciding section 217 decides the category under control of the category judging section 218. Conversely, when the category acquiring section 214 succeeds to acquire the category for the input motion picture data, the category deciding section 217 controls the operation of the video section 212 so that the category judging section 218 does not decide the category. At this time, a flow of operation of the recording block 201 in the motion picture recording/reproducing apparatus is as shown by FIG. 16.

Figure 16:
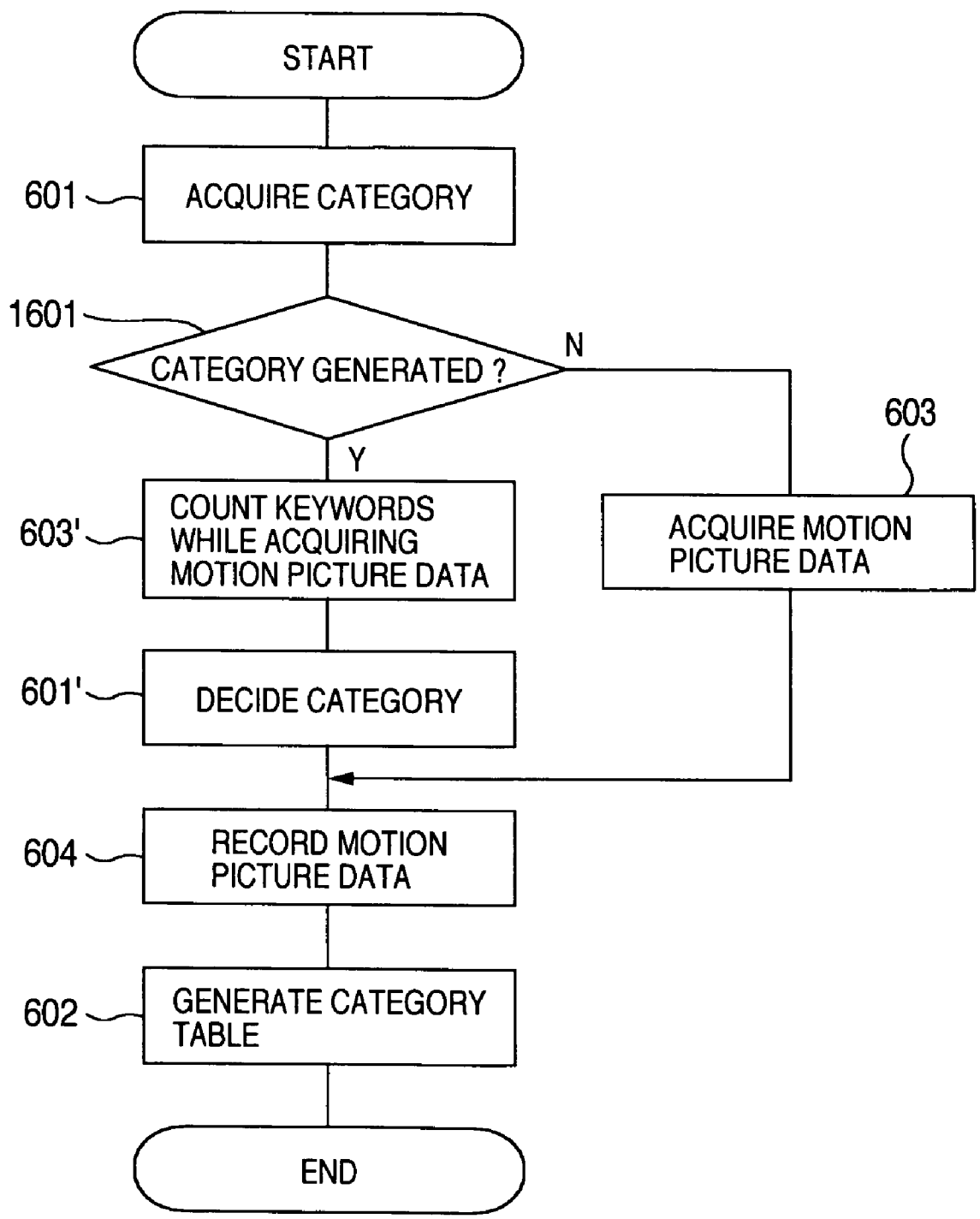
FIG. 16 is a flow chart for explaining the operation of a recording block 201 in the embodiment 3.

FIG. 16 is a flow chart for explaining the operation of the recording block 201 in the embodiment 3 of this invention.

As shown in FIG. 16, in the recording block 201 in the motion picture recording/reproducing apparatus of the embodiment 3, the category acquiring section 214 acquires a category for input motion picture data (step 601), and decides whether or not the category deciding section 217 succeeded to acquire the category of the input motion picture data to thereby judge generation of a category (step 1601). In the step 1601, when the category deciding section 217 succeeded to acquire the category of the input motion picture data, the recording block 201 judges no need of generation of a category, acquires the motion picture data (step 603), records it (step 604), and generates a category table (step 602). In the step 1601, when the category deciding section 217 fails to acquire the category of the input motion picture data, on the other hand, the recording block 201 decides the need of generation of a category, acquires the motion picture data, and counts frequencies of keywords therein in the category judging section 218 on the basis of the motion picture data (step 603'). And when the recording block 201 acquires all the motion picture data and finishes counting the keyword frequencies, the recording block 201 decides the category according to the keyword appearance frequencies (step 601'), records the motion picture data (step 604), and generates a category table on the basis of the decided category (step 602).

As a result, even when the motion picture recording/reproducing apparatus of the embodiment 3 fails to acquire a category for motion picture data to be recorded from data about an electronic program guide, the apparatus can decide the category, and can realize optimum highlight reproduction according to the category of the motion picture data.

This invention can be applied, for example, to a hard disk recorder for recording and reproducing motion picture data, a video tape recorder, a personal computer or the like.

It should be further understood by those skilled in the art that although the foregoing description has been made on embodiments of the invention, this invention is not limited thereto and various changes and modifications may be made without departing from the spirit of this invention and the scope of the appended claims.

The invention claimed is:

1. A motion picture recording/reproducing apparatus, having a storage unit which stores a motion picture data received as a broadcast data or acquired through a network and a reproducing unit which reproduces the motion picture data, comprising:
   a feature generating unit which generates a feature data of image or voice in each frame in the motion picture data stored in the storage unit;
   a feature data storage unit which stores the feature data of image or voice in each frame in the motion picture data, in the storage unit;
   a category acquiring unit which acquires a category which is assigned to the motion picture data stored in the storage unit;
   a ranking data storage unit which stores each scene having one or more frames to be candidate of highlight reproduction and ranking data corresponding to each scene, wherein said each scene and ranking data are decided by an algorithm which is selected from a plurality of algorithms according to the category acquired by the category acquiring unit, based on the feature data of image or voice in each frame stored in the feature data storage unit; and
   a reproduction scene deciding unit which decides a reproduction scene to be reproduced when a highlight reproduction designation including reproduction condition designation is received from outside, the reproduction scene deciding unit decides whether or not to reproduce each scene stored in the ranking data storage unit on the basis of the reproduction condition designation and the ranking data, and then decides the reproduction scene to be reproduced;
   wherein the reproducing unit reproduces more than two reproduction scenes decided by the reproduction scene deciding unit in a sequence arranged according to a reproduction time of the more than two reproduction scenes.

2. A motion picture recording/reproducing apparatus according to claim 1, wherein said category acquiring unit acquires an electronic program guide and acquires the category for the motion picture data from the electronic program guide.

3. A motion picture recording/reproducing apparatus according to claim 1, further comprising a broadcast data input unit, and wherein said category acquiring unit receives broadcast data from the broadcast data input unit, acquires the broadcast data from an electronic program guide, and acquires the category for the motion picture data from data about the electronic program guide.

4. A motion picture recording/reproducing apparatus according to claim 1, further comprising a network data transmitting/receiving unit, and wherein said category acquiring unit acquires an electronic program guide from a predetermined server through a network and acquires the category for the motion picture data from the data about the electronic program guide.

5. A motion picture recording/reproducing apparatus according to claim 1, further comprising an input unit through which a user enters a category, and wherein said category acquiring unit acquires the category entered by the user via the input unit, and said ranking data storage unit provides ranking of scenes in the motion picture data on the basis of the category entered by the user.

6. A motion picture recording/reproducing apparatus according to claim 1, wherein, when data about an electronic program guide including the category of the motion picture data is not acquired yet upon starting recording the motion picture data, said category acquiring unit receives broadcast data under control for a broadcast data input unit with a recording start as a trigger and acquires the electronic program guide from the broadcast data.

7. A motion picture recording/reproducing apparatus according to claim 1, wherein, when data about an electronic program guide including the category of the motion picture data is not acquired yet upon starting recording the motion picture data, said category acquiring unit acquires the electronic program guide with a recording start as a trigger from a predetermined server through a network under control of a network data transmitting/receiving unit.

8. A motion picture recording/reproducing apparatus according to claim 1, further comprising a sound recognizing unit which recognizes a sound included in the motion picture data, and wherein said category acquiring unit recognizes the sound included in the motion picture data under control of said sound recognizing unit, counts frequencies of predetermined keywords appeared therein, and decides the category of the motion picture data on the basis of the counted result.

9. A motion picture recording/reproducing apparatus according to claim 1, further comprising a caption data acquiring unit which acquires a caption included in the motion picture data, and wherein said category acquiring unit acquires a character string in a caption included in the motion picture data under control of the category acquiring unit, counts frequencies of predetermined keywords appeared therein, and decides the category of the motion picture data on the basis of the counted result.

10. A motion picture recording/reproducing apparatus according to claim 1, further comprising:
    a category deciding unit;
    a broadcast data input unit, a network data transmitting/receiving unit, or an input unit through which a user enters a category; and
    a sound recognizing unit which recognizes a sound included in the motion picture data or a caption data acquiring unit for acquiring caption data included in the motion picture data,
    wherein, when said category acquiring unit fails to acquire data about an electronic program guide under control of said network data transmitting/receiving unit, to acquire a category for the motion picture data on the basis of the electronic program guide data, and to receive the category from the user under control of said input unit, said category deciding unit recognizes the sound included in the motion picture data or acquires a character string of a caption included in the motion picture data under control of said sound recognizing unit or said caption data acquiring unit, counts frequencies of predetermined keywords appearing therein, and decides the category of the motion picture data on the basis of the counted result.

11. A motion picture recording/reproducing apparatus according to claim 1,
    wherein the reproduction scene deciding unit obtains a position of the motion picture data being reproduced by the reproducing unit, when the highlight reproduction designation is received while the motion picture data being reproduced, and decides the reproduction scene to be reproduced on the basis of the obtained reproduction point of the motion picture data, the reproduction condition designation and the ranking data.

12. A motion picture recording/reproducing apparatus according to claim 11, wherein the reproduction scene deciding unit extracts scenes of which end points are later than a position of the motion picture data being reproduced by the reproducing unit, and decides the reproduction scene to be reproduced.

13. A motion picture recording/reproducing apparatus according to claim 12, wherein the reproduction condition designation is a designation of a looking and listening time of the reproducing scenes.

14. A motion picture recording/reproducing apparatus according to claim 1, wherein the reproduction condition designation is a designation of a looking and listening time of the reproducing scenes.

15. A motion picture recording/reproducing apparatus according to claim 14, wherein the reproduction scene deciding unit sequentially selects reproduction scenes in a decreasing order of ranking data so that a total of the times of the reproduction scenes does not exceed the looking and listing time of the reproducing scenes.

* * * * *